United States Patent [19]
Lanigan, Sr. et al.

[11] Patent Number: 4,715,762
[45] Date of Patent: Dec. 29, 1987

[54] GRAPPLER SYSTEM FOR LIFTING APPARATUS

[75] Inventors: John J. Lanigan, Sr., Tinley Park; Myron Glickman, Morton Grove; Thazhuthekudiyil V. George, Chicago; Bernard A. Ermel, Clarendon Hills, all of Ill.

[73] Assignee: Mi-Jack Products, Inc., Hazel Crest, Ill.

[21] Appl. No.: 4,807

[22] Filed: Jan. 9, 1987

Related U.S. Application Data

[60] Continuation of Ser. No. 761,620, Aug. 1, 1985, abandoned, which is a division of Ser. No. 683,970, Dec. 12, 1984, Pat. No. 4,546,891, which is a continuation of Ser. No. 583,119, Feb. 24, 1983, abandoned, which is a continuation of Ser. No. 346,513, Feb. 8, 1982, abandoned.

[51] Int. Cl.[4] ........................ B66C 17/20; B65G 59/06

[52] U.S. Cl. .................................... 414/126; 212/205; 212/220; 294/81.21; 294/81.54; 414/460

[58] Field of Search ................................ 212/146–148, 212/205, 209, 213, 218, 220, 221, 242, 243, 251, 260; 294/81.1, 81.21, 81.5, 81.54; 414/70, 115, 125, 126, 140, 460, 461, 618, 619, 785

[56] References Cited

U.S. PATENT DOCUMENTS

| | | | |
|---|---|---|---|
| 2,701,065 | 2/1955 | Bertel | 414/239 |
| 3,536,350 | 10/1970 | Backteman | 294/81.41 X |
| 3,645,406 | 2/1972 | Brazell | 180/308 X |
| 3,669,290 | 6/1972 | Doyle | 414/459 |
| 4,139,228 | 2/1979 | Varadi | 294/81.53 X |
| 4,152,990 | 5/1979 | Theurer et al. | 294/81.54 X |
| 4,431,359 | 2/1984 | Toniolo | 414/459 X |

*Primary Examiner*—Robert J. Spar
*Assistant Examiner*—Janice Krizek
*Attorney, Agent, or Firm*—George H. Gerstman

[57] ABSTRACT

A lifting apparatus having a grappler system by which one or a plurality of stacked containers may be lifted and transported. The grappler system includes pin devices capable of being inserted into standard holes provided at the corners of the container. The grappler system operates to support the bottom two containers of a plurality in a stack being lifted and is capable of dropping off the bottom container, while maintaining support of the container thereabove. The apparatus includes a hollow center design so that the containers can extend to a position above the top structural portions of the crane.

11 Claims, 8 Drawing Figures

FIG. 5
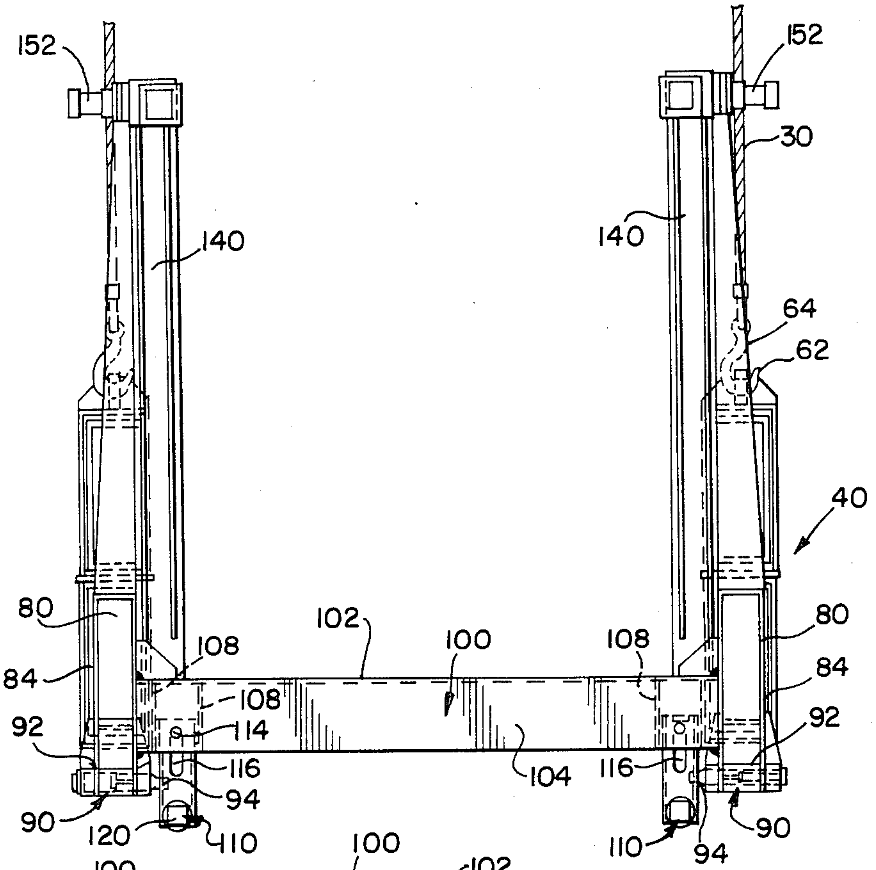
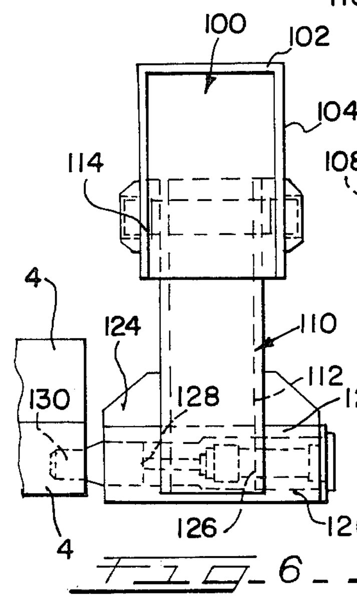
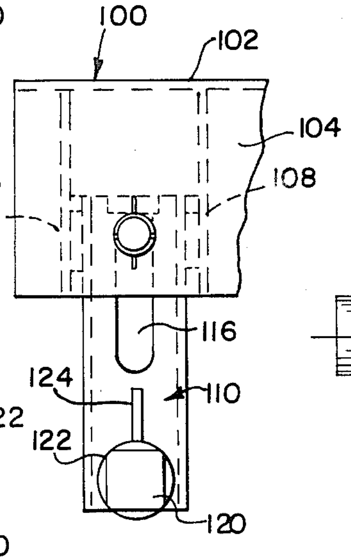
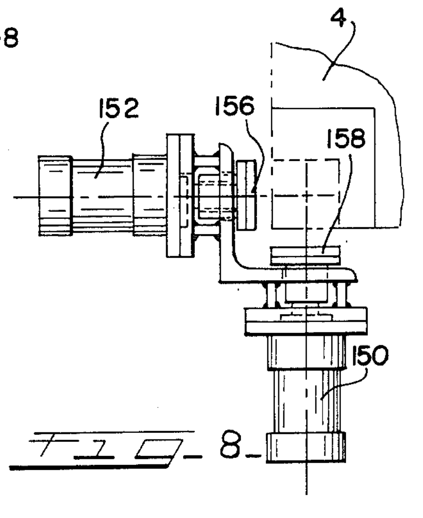
FIG. 6 FIG. 7 FIG. 8

GRAPPLER SYSTEM FOR LIFTING APPARATUS

This application is a continuation of U.S. application Ser. No. 761,620, filed Aug. 1, 1985, now abandoned, which is a division of U.S. application Ser. No. 683,970, filed Dec. 12, 1984, now U.S. Pat. No. 4,546,891, which is a continuation of Ser. No. 583,119, filed Feb. 24, 1983, now abandoned, which is a continuation of Ser. No. 346,513, filed Feb. 8, 1982, now abandoned.

BACKGROUND OF THE INVENTION

This invention relates in general to a lifting apparatus and, in particular, to an apparatus for lifting and transporting a plurality of large containers.

More specifically, but without restriction to the particular use which is shown and described, this invention relates to a lifting apparatus having a grappler system to secure a stack of containers for lifting and transporting. The apparatus of the invention is capable of accommodating a stack consisting of a number of containers having a height greater than the height of the crane. The grappler system is adapted to engage the lower two containers in the stack in a manner, such that the bottom container may be released, while maintaining support of the containers above the released one.

In the transportation industry, certain types of containers have been developed, which are sometimes referred to as "intermodal" systems. Such trailers form unitized containers fitted to be interchanged between a truck, in which it forms a trailer therefor, and a ship or railroad car. The design of such containers has evolved into well-known standardized forms, such as IASO or Matson containers and the like. Each of these containers employ corner castings at each upper and lower corner to define sixteen apertures, which have been heretofore selectively engaged by such components as hooks or pins and the like for lifting the container. A typical gantry crane engages suitable holes in the corner casting and lifts a container, after it is removed from a train or ship, for example, and transports the container to a storage area, or directly to a truck, or alternatively, from the storage area to a truck and so forth. The conventional designs for such gantry cranes are only capable of lifting a single container at a time and can not accommodate the lifting and transporting of a plurality of containers in a stack for efficiency of operation.

Because of space limitations, transporting schedules, and considerations of economy, it is conventional for several transit containers to be stacked together in a storage area, for example, for a period during exchange between vehicles and/or vessels. As a result of design limitations of conventional cranes, it is only possible to move one container at a time to form such stacks. Moreover, existing cranes can carry only one container over a stack of three or four containers high, because no design in the prior art permits handling of containers above the top of the equipment. In view of the foregoing deficiencies, it is obvious that known cranes can only pick-up the top container of any given stack of limited height and must return to completely remove every item from a stack.

Known lifting equipment also suffers from limitations of operative versatility. For example, no cranes are available which can lift a stack of containers and release one of the containers as desired without interferring with the support of the remaining items. Prior apparatus are also designed so that the top beam or structure limits the height at which a container can be lifted over the stack, and thus, the number of items to be stored on top of each other.

SUMMARY OF THE INVENTION

It is, therefore, an object of this invention to provide an apparatus for lifting and transporting one or a plurality of containers in a stack.

Another object of this invention is to provide a lifting apparatus capable of engaging for support adjacent containers in a stack.

A further object of this invention is to provide a lifting apparatus capable of independently releasing the bottom container of a stack of items being lifted.

Still another object of this invention is to provide a lifting apparatus capable of supporting and lifting a stack of containers extending beyond the upper structure of the apparatus.

Still further object of this invention is to provide a grappler system for a lifting apparatus capable of being adjusted to accommodate a range of sizes of containers being lifted.

These and other objects are attained in accordance with the present invention wherein there is provided an improved lifting apparatus having a grappler means adapted to lift the bottom pair of a stack of containers, such that optimum efficiency in the lifting and manipulating of stacks of containers is attained. The grappler system of the invention includes a plurality of engagement means to cooperate with selective holes of the corner castings conventionally provided in such large containers. The engagement means selectively is capable of being inserted into the holes of the upper corners of a lower container and the lower holes of a container immediately above, such that the grappler system will support the stack of containers independently through engagement with two items. This design permits the lower container to be independently released in a manner that the remaining stack of containers is still carried by the lifting apparatus for attaining increased versatility and manipulation of the stack, such as for example, in a storage area or other location.

DESCRIPTION OF THE DRAWINGS

Further objects of the invention together with additional features contributing thereto and advantages accruing therefrom will be apparent from the following description of a preferred embodiment of the invention, which is shown in the accompanying drawings with like reference numerals indicating corresponding parts throughout, wherein:

FIG. 5 is an end schematic view of the grappler system of FIG. 4;

FIG. 6 is an enlarged schematic side view of the front latching mechanism of the grappler system of FIG. 5 for engaging the top corners of a lower container;

FIG. 7 is an end schematic view of the latching mechanism of FIG. 6; and

FIG. 8 is a top schematic view of one of the top container retaining assemblies of the lifting apparatus of FIG. 1.

DESCRIPTION OF A PREFERRED EMBODIMENT

Figure 1:
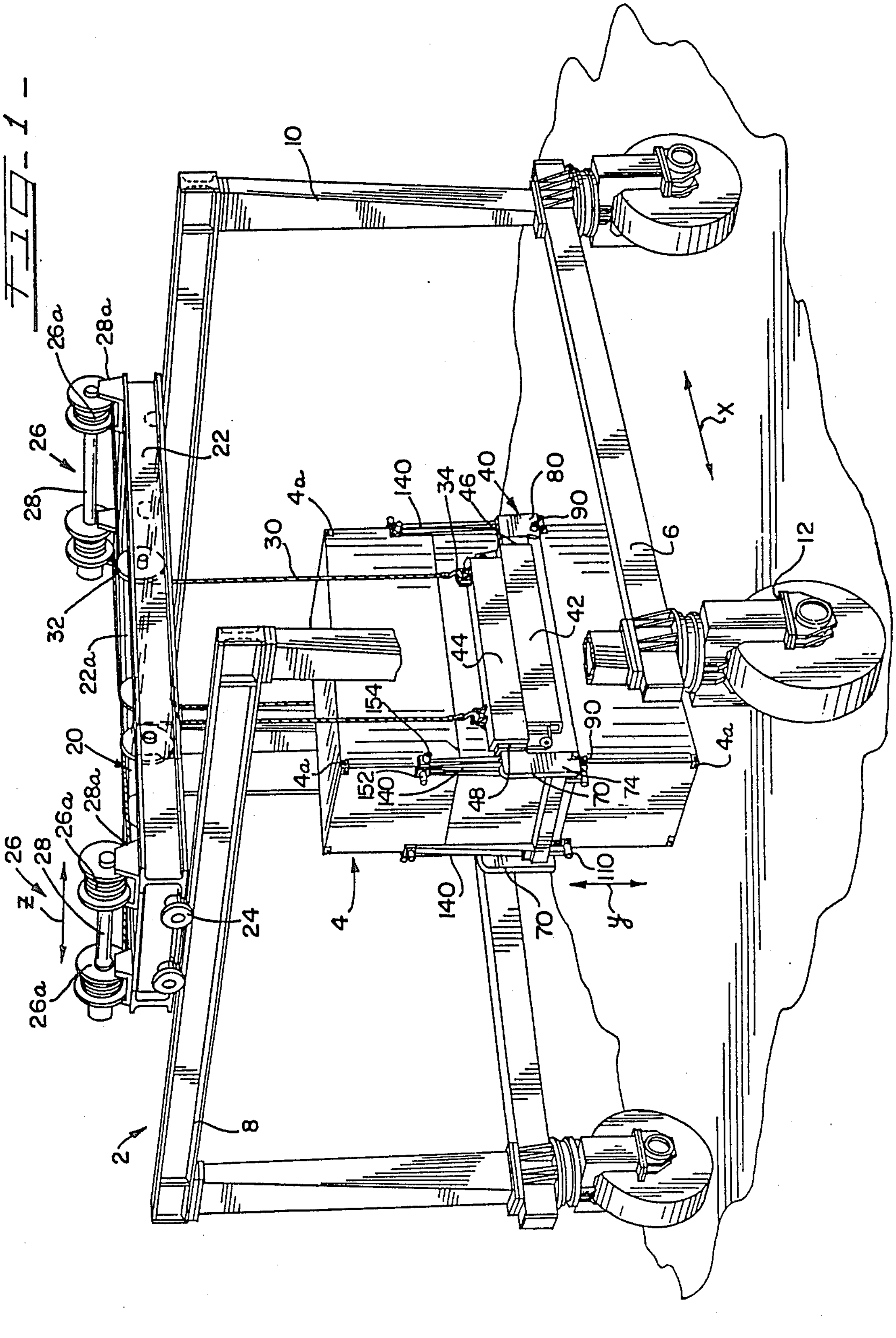
FIG. 1 is a side perspective view of the lifting apparatus of the invention operatively engaging a stack of three containers for lifting.

Referring now to FIG. 1 there is illustrated an apparatus 2 of the invention capable of lifting and transporting one, or a stack of a plurality of large containers, such as used in the well-known "piggyback" applications. For purposes of illustration, apparatus 2 is shown in FIG. 1 in operative contact to lift a stack of three containers 4. Generally, containers 4 are the type of large container, which may be placed on wheels and utilized as a trailer or truck, or may be placed on the bed of a railroad car, transported by ship or stored in stacked form in a loading area and the like.

Containers 4 are conventionally provided with corner devices or corner castings 4*a*, which provide holes to enable a crane and the like to lift and transport the containers from place to place. Corner castings 4*a* are typically situated at each of the eight corners of the rectilinear container 4. As a result, the front and rear walls of containers each have four holes 4*a* situated at each corner, while the container side walls both have four holes at their respective corners.

Lifting apparatus 2 is in the form of a gantry crane having two elongated horizontal lower beams 6, four upper beams 8 and four vertical corner beams 10 to create an interconnected, open-centered frame work of the structure. The crane is mounted or supported by a typical wheel assembly 12 suitably affixed by brackets and the like to the lower beam 6 to permit the lifting apparatus 2 to be moved in a conventional manner by suitable power means (not shown). Thus, viewing FIG. 1, it can be seen that the apparatus 2 can be maneuvered over a stack of containers 4 for lifting and transporting to another location as needed. Two of the upper beams 8, being laterally disposed in parallel relationship to each other in a horizontal plane, function as tracks upon which a movable bridge 20 is carried for selective movement. The platform 20 comprises a rectangular, open-centered structure defined by four interconnecting beams 22, such that the structure defines an opening 22*a* having a sufficient size to enable containers 4 to pass therethrough without interference with the bridge. This design of the apparatus 2 permits the lifting of a portion of the stack of containers 4 to a vertical position, above both the beams 8 and the bridge 20.

Figure 2:
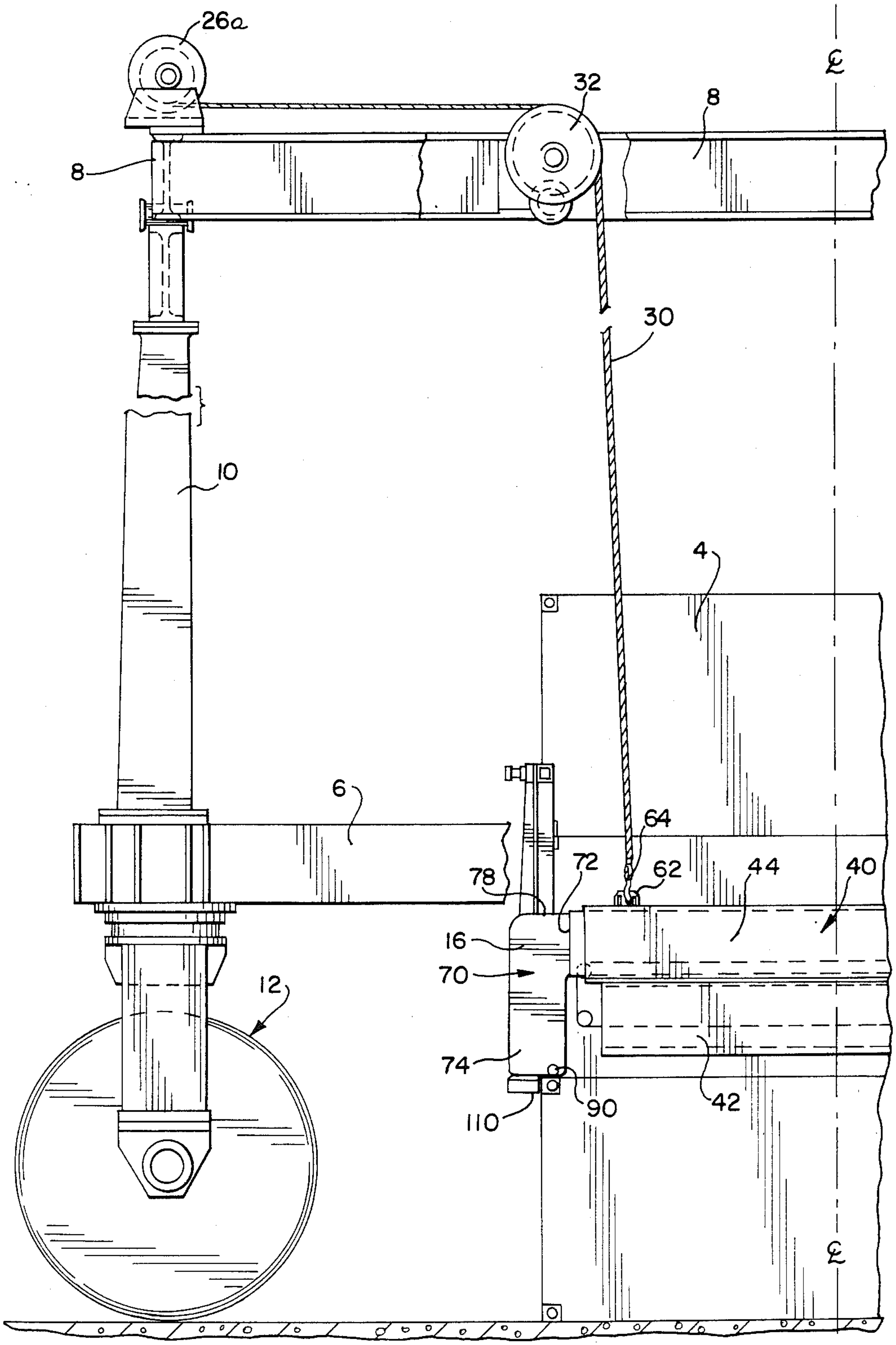
FIG. 2 is a partial schematic side view of the lifting apparatus of FIG. 1.
Figure 3:
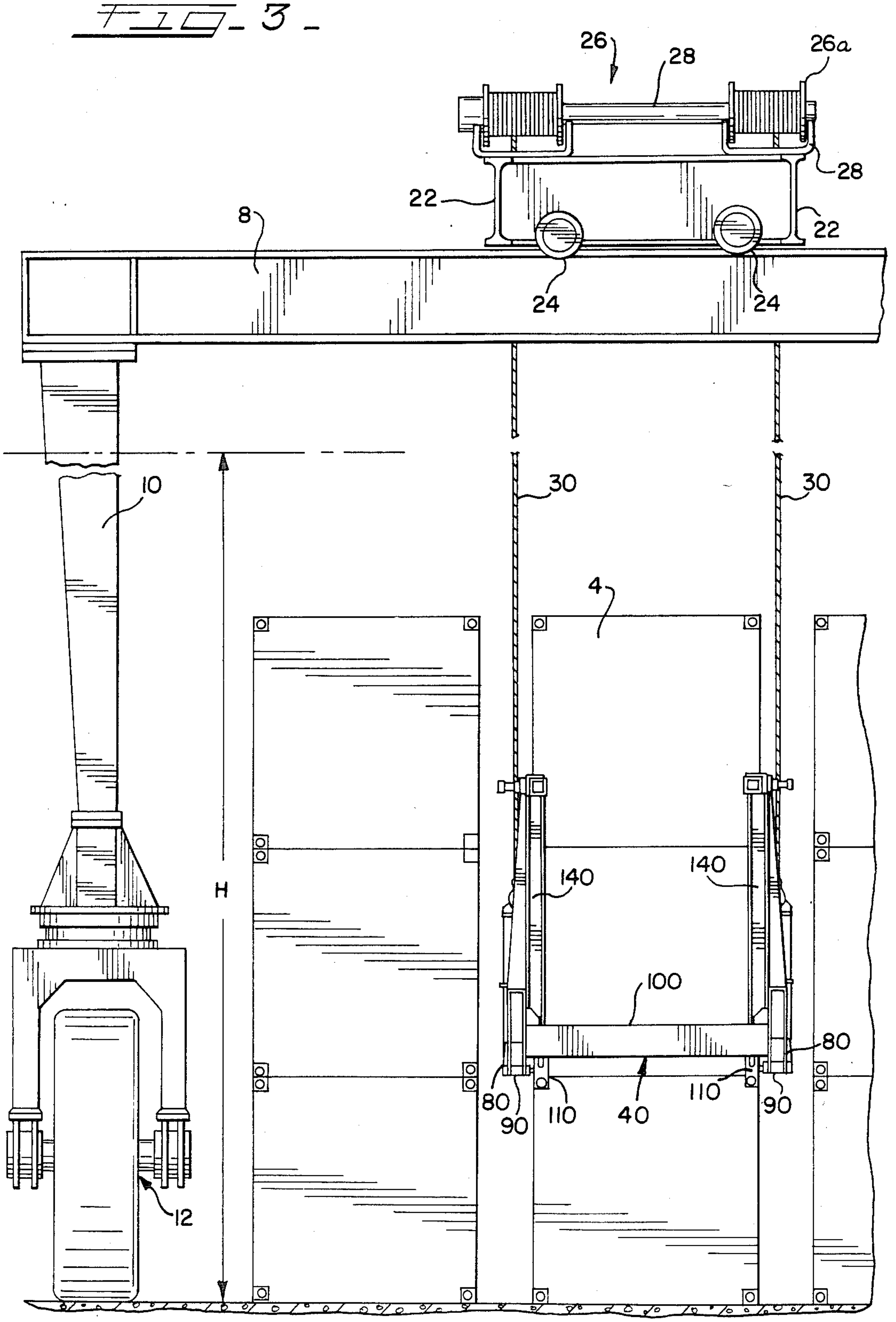
FIG. 3 is a partial schematic end view of the lifting apparatus of FIG. 1, showing the capability of the invention to lift any one of three side-by-side stacks of containers.

The movable bridge 20 is provided with a pair of wheel assemblies 24 on each side in contact with the lateral upper beams 8 to permit movement of the bridge by a conventional technique (not shown) in direction Z shown in FIG. 1. As seen in FIG. 3, the bridge 20 may be oriented above the center one of three stacks of containers 4, or above the end stacks, and the like. A pair of drum assemblies 26 are mounted on bridge 20 and include a respective pair of drums 26*a* mounted at each end of a power driven shaft 28 rotatably supported on brackets 28*a* about an axis extending substantially parallel to the direction of movement of the bridge relative to lateral beams 8. The drum assemblies each are coupled to a power drive to achieve lifting and lowering of a load supported by elongated elements in a manner well-known in the art. Each of the four drums 26*a* support a downwardly extending cable or chain 30, which is directed about respective intermediate pulley members 32 rotatably mounted on the longitudinally disposed upper beams 8, as best shown in FIGS. 1 and 2. The lower ends of cables 30 are adapted to be secured to the grappler system 40 of the invention and lift or lower the containers 4 in a vertical direction as shown by arrow Y in FIG. 1.

Figure 4:
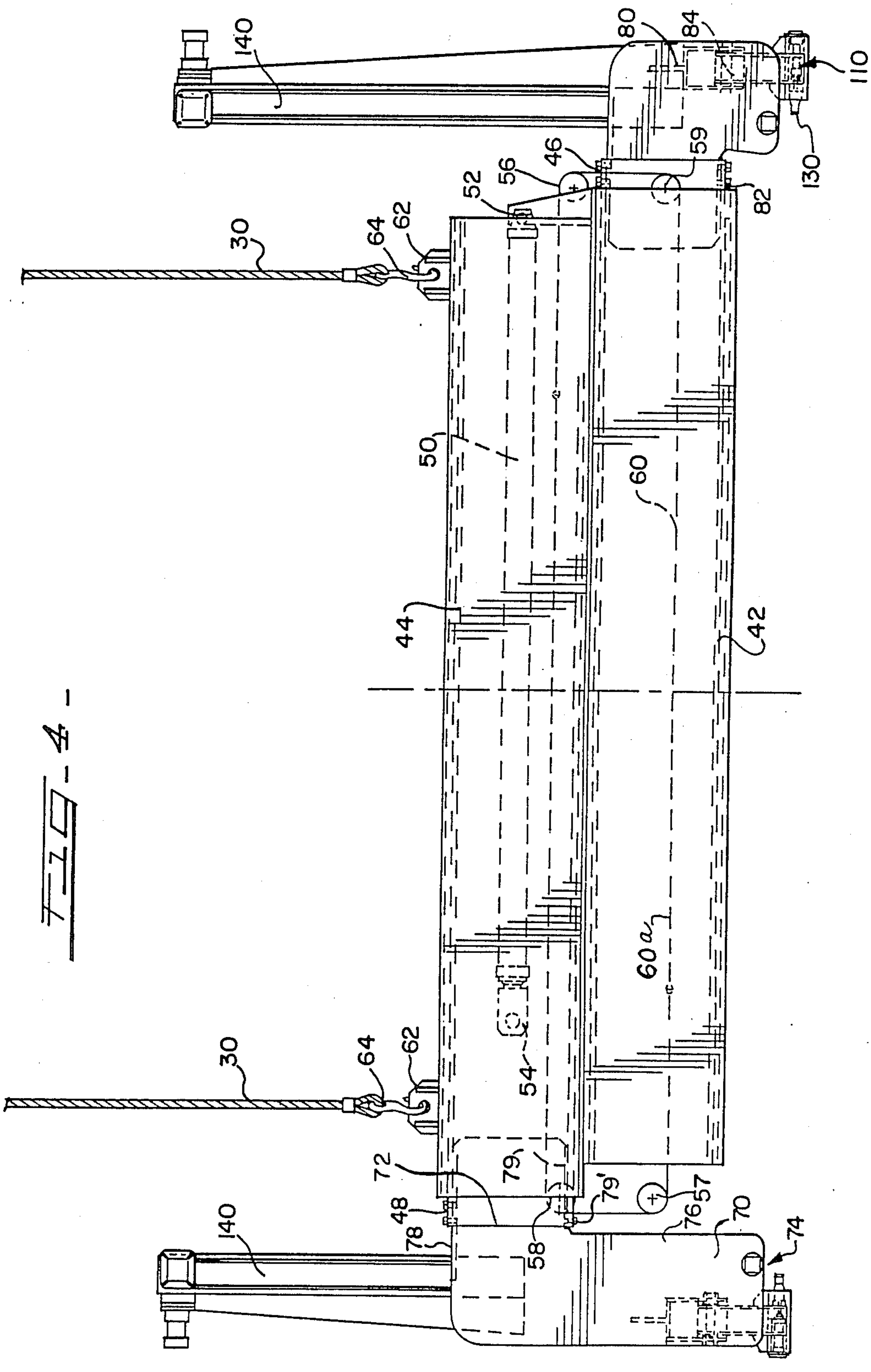
FIG. 4 is a side schematic view of the grappler system of the lifting apparatus of FIG. 1.

Referring now to FIGS. 1 through 7, the grappler system 40 of the invention is best illustrated. As shown in FIGS. 1 and 4, grappler system 40 includes two pairs of square tubular beams 42 and 44 which are welded together, one on top of the other, and each pair is adapted to be disposed on a side of the container 4 along the longitudinal dimension thereof. Telescoping inner tubular members 46 and 48 are respectively disposed within beams 42 and 44 in an opposite orientation to each other, such that the longitudinal extent of the grappler system 40 can be modified to adjust to containers having a longer longitudinal dimension. To achieve such extension, a hydraulic cylinder 50 is mounted within upper extendible member 48. One end of hydraulic cylinder 50 is mounted in fixed relation to the lower beam 42 by a suitable bracket 52. The extensible end 54 of the cylinder 50 is affixed by a suitable connector to inner member 48. This coupling permits the inner element 48 to move telescopically outwardly from within upper beam 44 to lengthen the longitudinal extent of the grappler system.

The hydraulic cylinder 50 is coupled to a suitable source of hydraulic pressure (not shown). The extensible movement of upper inner member 48 is coordinated with the lower inner member 46 by a pulley system, which causes the lower inner member 46 to extend outward from lower beam 42 at the same rate as the upper beam 48. The pulley system consists of four fixed pulley elements 56, 57, 58 and 59 suitably affixed to the frame. Pulleys 56, 57, 58 and 59 support cables 60 and 60*a* which are affixed to inner members 46 and 48, whereby upon extension of the hydraulic device 50, both end portions of inner beam 46 will extend outwardly in opposite directions to increase the length of the grappler system. Withdrawal of the cylinder 50 will likewise reduce the length from its extended configuration as desired.

As best shown in FIG. 4, a pair of brackets 62 are welded to the upper surface of both upper beams 44 adjacent their ends. Each bracket 62 is provided with a hole through which a respective hook connection 64, attached to the end of the four cables 30, is inserted to suspend the grappler system 40 from the bridge 20. The extensible end of inner telescopic member 48 is secured to a bracket 70 having an upper horizontally disposed section 72 and an integrally downwardly dependent body 74, having a lower edge situated beneath the lower beam 42. The body 74 of the bracket 70 is formed as a rectangular, tubular structure having a pair of vertical plates 76, an upper plate 78, and open bottom, the structure being welded together as best shown in FIGS. 1, 2 and 4. The inner portion of plate 78 and a lower angled section 79 form the horizonal surfaces of upper section 72 and are attached to member 48 by bolt assemblies 79'. Similarly, a bracket 80 is secured to the extensible end of the lower inner member 46 and includes an inwardly disposed portion 82 suitably bolted thereto as illustrated in FIGS. 4 and 5.

A downwardly depending hollow body 84 having an open bottom extends downward to a bottom edge in approximate alignment with the bottom of bracket 70.

Side latching mechanisms 90, situated in the lower portions of brackets 70 and 80, extend inwardly to confront both sides of a container 4 positioned therebetween. As shown in FIG. 5, a latching assembly 90 includes a cylindrical casing 92 having a known hydraulic cylinder therein, which is coupled to an appropriate source of hydraulic fluid (not shown). The extensible end of the hydraulic cylinder 90 is directed inwardly and carries a pin 94 having a shaped end. Pin 94 is adapted to be inserted into the holes in the bottom corner casting of a container 4 to latch the grappler system 40 to the sidewall of a container at four locations. As illustrated in FIG. 1, latching mechanism 90 is inserted to lift the bottom corner casting of a container stacked over a lower one.

As best shown in FIG. 5, brackets 70 and 80 support a pair of identical cross beams 100 respectively adapted to span the two ends of a container 4. The cross beams 100 comprises a plurality of elongated plates welded together to form a generally U-shaped configuration having an upper horizontal plate 102 and a pair of downwardly disposed walls 104 welded thereto as best shown in FIG. 6. A pair of spaced cross plates 108 are welded at each end of cross beams 100 between walls 104. Four front latching mechanisms 110 extend downwardly in securement between each pair of plates for latching the top corner castings at the front and rear of the container which is beneath the container to which the latching mechanisms 90 are secured.

As best shown in FIGS. 5, 6 and 7, the latching mechanisms 110 each comprise a square tubular body 112 having an upper portion extending upward between plates 108. The body 112 is secured to the cross beams 100 by an elongated shaft assembly 114 which is disposed in a vertical elongated slot 116 formed in opposed walls of body 112. A suitable hydraulic cylinder assembly 120 extends through the bottom portion of the body 112 and includes a tubular housing or casing 122 extending through the bottom portion of the body 112. The casing is secured thereto by plates 124 suitably affixed to both the body of casing 122 and the housing 112. A hydraulic cylinder 126 having an extensible end 128 is mounted in casing 122 and is in fluid communication with a source of hydraulic fluid (not shown). The extensible end 128 of each cylinder supports a pin 130 which is adapted to be inserted into the holes of the upper front and back corner castings. As can be seen in FIGS. 6 and 7 the weight of the latching mechanism 110 causes the body 112 to drop to its lowest position because of slot 116. At such a position the respective pins 130 may be oriented with the holes in the top corner castings of both the front and the back of the bottom container 4. In addition, upon withdrawal of the pins 130 from the top corner castings to release a bottom container independently of the container thereabove as will be described, the entire grappler system 40 can be lowered onto a support surface, in absence of the lower independently released container, without damage to the front latching mechanism, since the slot 116 permits the body 112 thereof to withdraw into beams 100 without damage thereto.

Four corner posts 140 are secured to the respective ends of the cross beam members 100 and are formed as a pair of right angle sections that extend upward to a position just above a third container in a stack. The upright posts 140 act as guides to enable the corners of the containers above the grappler to be supported during lifting. At the upper ends of the corner posts 140, a pair of hydraulic cylinders 150 and 152 are operatively positioned. The cylinders have extensible ends 156 and 158 which can apply a gentle centering force against the upper container in operation (as shown in spaced relation in FIG. 8), such that correct orientation of the containers is achieved during lifting.

In operation of the lifting apparatus of the invention, the system may be moved and manipulated over a stack of containers, which can be three or more in each stack. As shown in FIG. 3, the bridge 20 may be moved to a position over one of a plurality of stacks over which the gantry crane has been positioned, or where one of a stack is to be moved. The bridge 20 is then operated to lift a stack thereunder or to lower or lift a stack into a position under the bridge. When the bridge is situated over a stack to be lifted, the grappler system 40 is lowered under the action of the power means (not shown) operating the pulley cable system 30. A known hole sensing device (not shown) may be employed, such that the lowering of the grappler system 40 to the correct position in alignment with a hole may automatically be determined. These devices are capable of sensing the presence of each of the holes within the bottom side corner castings and the upper front and back corner castings of the two lower containers to align each of the pin members of respective latching assemblies 90 and 110 with the holes for a latching operation. The latched containers thereby may be lifted upward in a manner that the upper portion of the stack of containers 4 may extend above both the upper beams 8 of the crane and the upper portions of the bridge 20, because of its open center configuration permitting the passage of the containers therethrough. In addition, the bottom container of the stack may be independently released by unlatching of the front and back latching assemblies 110 without disturbing support of the remaining container secured to the grappler 40 by latching mechanism 90. The lifting apparatus 2 herein described is capable of not only lifting a stack of item in the manner described, but is also capable of lifting one item at a time when appropriate.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that invention not be limited to the particular embodiment disclosed as the best mode contemplated for carrying out this invention, but that the invention will include all embodiments falling within the scope of the appended claims.

What is claimed is:

1. An apparatus for lifting containers of the type having lifting apertures at the corners thereof, which comprises:

an interconnected open center frame;

an open center bridge supported by said frame;

lift means carried by said open center bridge;

single grappler means connected to said lift means for engaging one or more of a plurality of stacked containers;

means operatively connecting said lift means to said grappler means to position said grappler means adjacent a stack of containers for lifting one or more of the containers;

said open center bridge being disposed above said grappler means with the open center permitting containers to be elevated to a vertical position above the bridge;

said grappler means including first latching means mounted for engaging apertures of a first container and second latching means mounted for engaging apertures of a second container carried on the first container;

said grappler means further including means for permitting withdrawal of said first latching means from said first container while permitting said second latching means to remain in engagement with the second container.

2. An apparatus for lifting containers as described in claim 1, in which said first latching means comprises at least a first pair of pin members horizontally arranged generally along a first common horizontal axis; and said second latching means includes at least a second pair of pin members horizontally arranged generally along a second horizontal axis normal to said first axis.

3. An apparatus for lifting containers as described in claim 2, said axis of said first pair of pin members being vertically spaced from the axis of said second pair of pin members to permit said first and second pairs of pin members to simultaneously engage the apertures in the first container and the second container.

4. An apparatus for lifting containers as described in claim 3, said grappler means having frame means, said frame means including spaced lateral beams and a pair of longitudinal beams supporting said second latching means, said longitudinal beams being selectively extensible to vary the length thereof to accommodate different size containers.

5. An apparatus for lifting containers as described in claim 4, wherein said first latching means depends downwardly from said pair of spaced lateral beams, said first latching means further including means for permitting withdrawal of said first pair of pins of said first latching means from said lowermost container.

6. An apparatus for lifting containers as described in claim 1, in which said lift means comprises drums supporting downwardly extending cables or chains which are directed about respective pulley members.

7. An apparatus for lifting containers as described in claim 1, wherein said first latching means includes two pairs of spaced pin members, the pin members of each pair being movable coaxially toward each other; said second latching means including two second pairs of spaced pin members, the pin members of one second pair being movable coaxially toward the corresponding pin members of the opposite pair.

8. An apparatus for lifting containers as described in claim 7, wherein the axis of movement of said pin members of said first latching means is below the axis of movement of said pin members of said second latching means.

9. An apparatus for lifting containers of the type having lifting apertures at the corners thereof, which comprises:

an interconnected open center frame;

an open center bridge supported by said frame;

lift means carried by said open center bridge, said lift means comprising a plurality of drums each supporting a downwardly extending cable or chain directed around a respective pulley rotatably mounted to said bridge;

single grappler means connected to said lift means for engaging one or more of a plurality of stacked containers;

means operatively connecting said cables or chains to said grappler means to position said grappler means adjacent a stack of containers for lifting one or more of the containers;

said open center bridge being disposed above said grappler means with the open center permitting containers to be elevated through the bridge and to a vertical position above the bridge;

said grappler means including first latching means mounted for engaging apertures of a first container and second latching means mounted for engaging apertures of a second container carried on the first container;

said first latching means including at least a first pair of pin members horizontally arranged generally along a first common horizontal axis for respective insertion into said apertures of the first container;

said second latching means including at least a second pair of pin members horizontally arranged generally along a second horizontal axis normal to said first axis for respective insertion into apertures of said second container;

said axis of said first pair of pin members being vertically spaced from the axis of said second pair of pin members to permit said first and second pairs of pin members to simultaneously engage the first container and the second container;

said grappler means further having frame means, said frame means including spaced lateral beams and a pair of longitudinal beams supporting said second latching means, said longitudinal beams being selectively extensible to vary the length thereof to accommodate different size containers; and said grappler means further including means for permitting withdrawal of said first latching means from said first container while permitting said second latching means to remain in engagement with the second container.

10. The apparatus of claim 1 having means permitting lateral movement of said grappler means to permit lateral movement of containers carried thereby.

11. The apparatus of claim 9 having means permitting lateral movement of said grappler means to permit lateral movement of containers carried thereby.

* * * * *